US009449063B2

(12) United States Patent
Sinclair et al.

(10) Patent No.: US 9,449,063 B2
(45) Date of Patent: Sep. 20, 2016

(54) SYNCHRONIZATION OF FORM FIELDS IN A CLIENT-SERVER ENVIRONMENT

(75) Inventors: Russell Sinclair, Seattle, WA (US); Michael Hopkins Smith, Seattle, WA (US); Clinton Dee Covington, Redmond, WA (US); Jenefer Monroe, Seattle, WA (US); Konrad Tupaj, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1171 days.

(21) Appl. No.: 12/943,955

(22) Filed: Nov. 11, 2010

(65) Prior Publication Data

US 2012/0102093 A1 Apr. 26, 2012

Related U.S. Application Data

(63) Continuation of application No. 12/910,875, filed on Oct. 25, 2010.

(51) Int. Cl.

| | |
|---|---|
| ***G06F 3/00*** | (2006.01) |
| ***G06F 17/30*** | (2006.01) |
| ***G06F 17/24*** | (2006.01) |

(52) U.S. Cl.

CPC ....... *G06F 17/30575* (2013.01); *G06F 17/243* (2013.01); *G06F 17/30345* (2013.01)

(58) Field of Classification Search

CPC .................. G06F 17/30345; G06F 17/30365; G06F 17/243; G06F 17/246

USPC .......................................................... 715/747

See application file for complete search history.

(56) References Cited

U.S. PATENT DOCUMENTS

| | | | | |
|---|---|---|---|---|
| 5,608,898 | A * | 3/1997 | Turpin | G06F 8/34 |
| 6,170,013 | B1 | 1/2001 | Murata | |
| 6,907,451 | B1 | 6/2005 | Mukundan et al. | |
| 7,096,418 | B1 | 8/2006 | Singhal et al. | |
| 7,194,743 | B2 * | 3/2007 | Hayton et al. | 719/315 |
| 7,509,393 | B2 | 3/2009 | Agarwalla et al. | |
| 2002/0105548 | A1 * | 8/2002 | Hayton et al. | 345/764 |
| 2002/0111992 | A1 | 8/2002 | Copeland et al. | |

(Continued)

OTHER PUBLICATIONS

Benson, et al., "Sync Kit: A Persistent Client-Side Database Caching Toolkit for Data Intensive Websites", Retrieved at << http://db.csail.mit.edu/pubs/sync-kit.pdf >>, Apr. 26-30, 2010, pp. 10.

(Continued)

*Primary Examiner* — Dino Kujundzic

(74) *Attorney, Agent, or Firm* — Damon Rieth; Tom Wong; Micky Minhas

(57) ABSTRACT

A database tier maintains and provides access to a database. An application tier receives and responds to requests for a form. The form includes data defining a first UI control for displaying a first value from the database and a second UI control for displaying a second value from the database that is dependent upon the first value. A client tier renders the form to show the first value in the first UI control and to show the second value in the second UI control. The client tier also detects a modification to the first value and causes an updated second value to be generated in response to detecting the modification to the first value. The updated second value is displayed by way of the second UI control. The updated second value is generated at the client tier, the application tier, the database tier, or at a combined application/database tier.

18 Claims, 10 Drawing Sheets

502

ORDER ENTRY FORM

120A ORDER NO. 1234

CUSTOMER NO. 1 / 2 / 3 — 120B

CUSTOMER NAME CONTOSO, INC. — 120C

CUSTOMER PHONE (404) 555-1212 — 120D

TAX RATE 7% — 120E

120F SHIPPER ID UPS

SHIP RATE $5 — 120G

120H ITEM COUNT 5

TOTAL PRICE $31.75 — 120I

504 SAVE

(56) References Cited

U.S. PATENT DOCUMENTS

| | | | |
|---|---|---|---|
| 2003/0182222 | A1* | 9/2003 | Rotman ........... G06Q 10/08345 705/37 |
| 2004/0237040 | A1 | 11/2004 | Malkin et al. |
| 2004/0239681 | A1 | 12/2004 | Robotham et al. |
| 2005/0183002 | A1 | 8/2005 | Chapus |
| 2006/0074981 | A1 | 4/2006 | Mauceri, Jr. et al. |
| 2008/0244582 | A1* | 10/2008 | Brown et al. ................. 718/100 |
| 2009/0265301 | A1 | 10/2009 | Chen et al. |
| 2009/0327140 | A1 | 12/2009 | Kuo |
| 2010/0070480 | A1 | 3/2010 | Ahuja et al. |
| 2010/0100458 | A1 | 4/2010 | Kwon |
| 2011/0082889 | A1 | 4/2011 | McArdle et al. |
| 2011/0131479 | A1 | 6/2011 | Padgett et al. |
| 2011/0307238 | A1 | 12/2011 | Scoda |
| 2011/0314079 | A1 | 12/2011 | Karande et al. |
| 2012/0023154 | A1 | 1/2012 | Demant et al. |
| 2012/0054263 | A1 | 3/2012 | Demant et al. |
| 2012/0102092 | A1 | 4/2012 | Sinclair et al. |
| 2012/0102412 | A1 | 4/2012 | Sinclair et al. |

OTHER PUBLICATIONS

"How to: Implement Key-Based Dependencies for Data Caching in Asp.Net by Using Visual C# .Net ", Retrieved at << http://support.microsoft.com/kb/308147 >>, Aug. 28, 2007, pp. 5.

Mosa, Muhammad, "ASP.NET Caching: SQL Cache Dependency with SQL Server 2000", Retrieved at << http://www.c-sharpcorner.com/uploadfile/mosessaur/sqlcachedependency01292006135138pm/sqlcachedependency.aspx?articleid=3caa7d32-dce0-44dc-8769-77f8448e76bc >>, Jan. 30, 2006, pp. 7.

Mohanty, Shubhabrata, "Cache Management in ASP.NET", Retrieved at << http://www.codeproject.com/KB/web-cache/cachemanagementinaspnet.aspx >>, Oct. 28, 2005, pp. 7.

"Effectively Use the Cache Object in ASP.NET Designs", Retrieved at << http://articles.techrepublic.com.com/5100-10878_11-5034946.html >>, May 14, 2003, pp. 3.

Prosise, Jeff, "Supporting Database Cache Dependencies in ASP.NET", Retrieved at << http://msdn.microsoft.com/en-us/magazine/cc188758.aspx >>, Apr. 2003, pp. 8.

"How to Resolve ASP.NET Cache Limitations Using NCache", Retrieved at << http://www.alachisoft.com/ncache/asp-net-cache.html>>, Retrieved Date: Jul. 14, 2010, pp. 5.

"Resynchronising Disconnected ADO Recordsets", Retrieved at << http://202.102.233.250/b2000/ASP/articles/database/cn990908.htm >>, Jul. 14, 2010, pp. 6.

"Add or Change a Lookup Column", Microsoft.com, retrieved Nov. 8, 2010 from http://office.microsoft.com/en-us/access-help/add-or-change-a-lookup-column-HA010163773.aspx?CTT=1, 14 pages.

U.S. Official Action dated Feb. 1, 2013 in U.S. Appl. No. 12/943,954.

U.S. Official Action dated Aug. 30, 2012 in U.S. Appl. No. 12/943,954.

U.S. Official Action dated Nov. 20, 2012 in U.S. Appl. No. 12/910,875.

U.S. Official Office Action dated Jun. 10, 2013 in U.S. Appl. No. 12/910,875.

U.S. Official Action dated Sep. 11, 2013 in U.S. Appl. No. 12/943,954.

U.S. Official Action dated May 20, 2014 in U.S. Appl. No. 12/910,875.

U.S. Official Action dated Jan. 6, 2014 in U.S. Appl. No. 12/943,954.

* cited by examiner

Figure 5A:
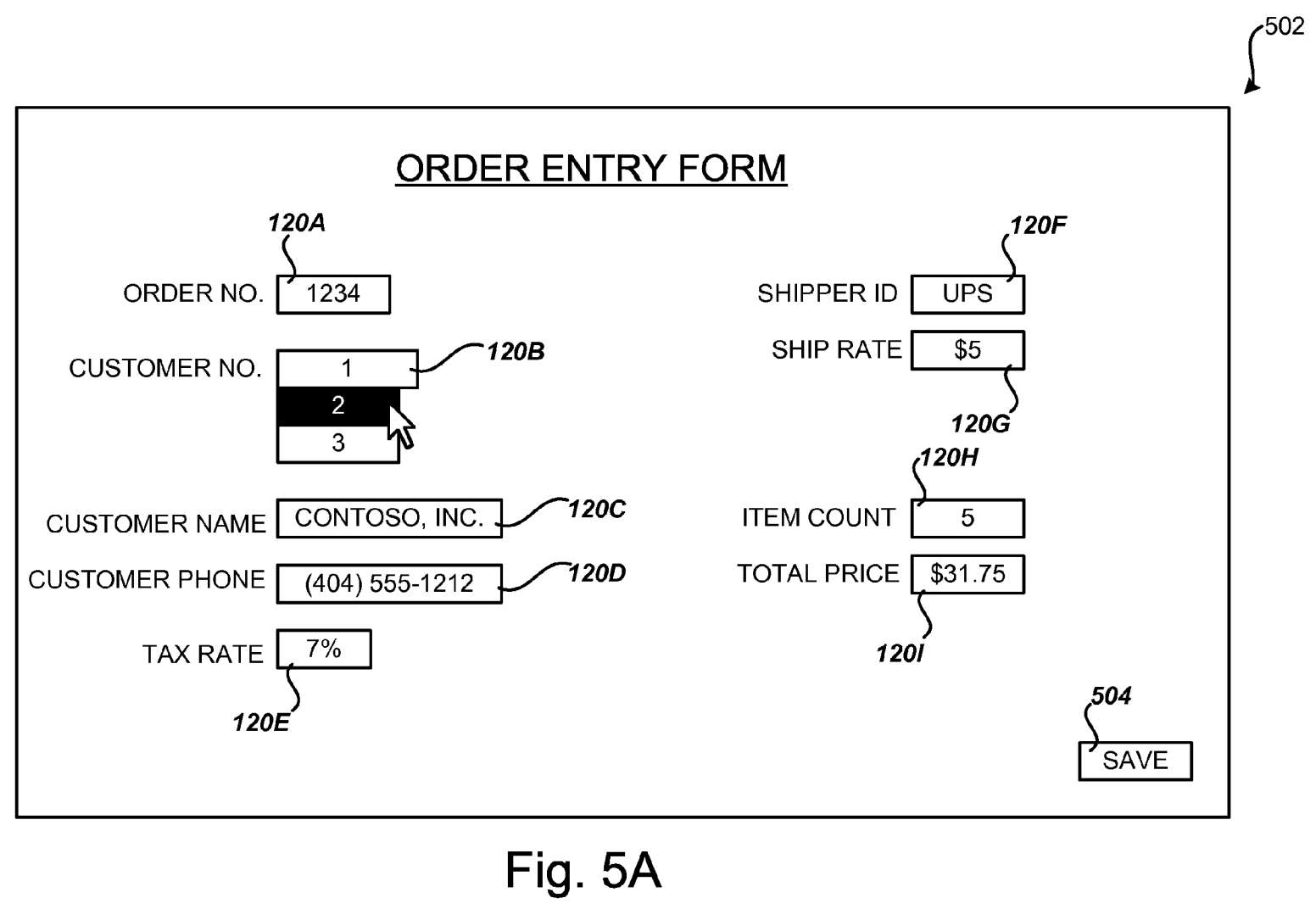

502

ORDER ENTRY FORM

ORDER NO. 1234 120A

CUSTOMER NO. 1 2 3 120B

CUSTOMER NAME CONTOSO, INC. 120C

CUSTOMER PHONE (404) 555-1212 120D

TAX RATE 7% 120E

SHIPPER ID UPS 120F

SHIP RATE $5 120G

ITEM COUNT 5 120H

TOTAL PRICE $31.75 120I

SAVE 504

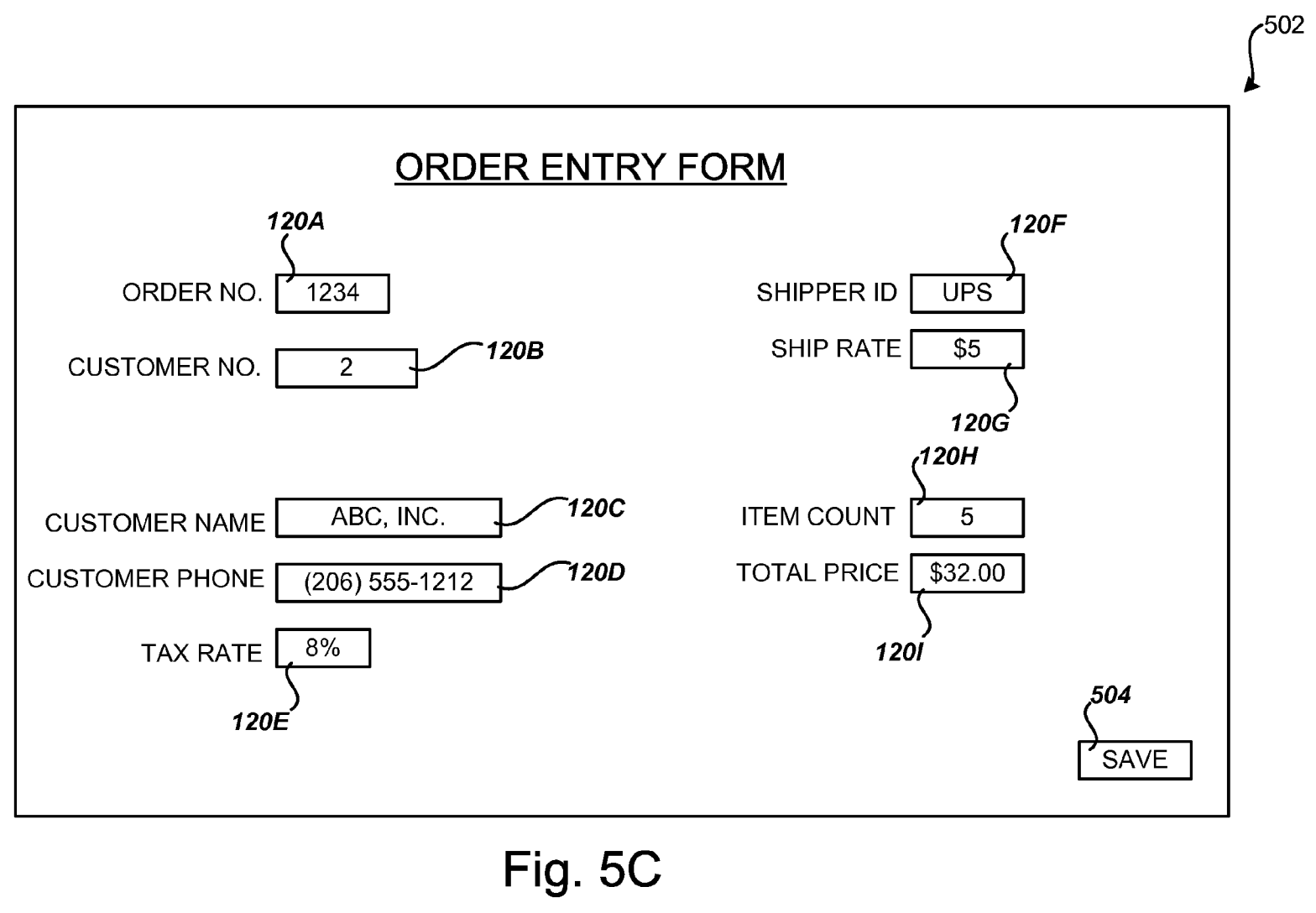

ORDER ENTRY FORM

ORDER NO. 1234 120A

CUSTOMER NO. 2 120B

CUSTOMER NAME ABC, INC. 120C

CUSTOMER PHONE (206) 555-1212 120D

TAX RATE 8% 120E

SHIPPER ID UPS 120F

SHIP RATE $5 120G

ITEM COUNT 5 120H

TOTAL PRICE $32.00 120I

504 SAVE

Fig. 5C

SYNCHRONIZATION OF FORM FIELDS IN A CLIENT-SERVER ENVIRONMENT

CROSS-REFERENCE TO RELATED APPLICATIONS

This application is a continuation of co-pending U.S. patent application Ser. No. 12/910,875 entitled "Synchronization of Form Fields in a Client-Server Environment," filed Oct. 25, 2010, which is expressly incorporated herein by reference in its entirety.

BACKGROUND

Database applications commonly utilize forms to display database information and for data entry. These forms utilize fields to display information retrieved from a database and to collect data for storage in the database. In certain database systems, it is possible to define a field on a form that is dependent upon another field on the form. For instance, a form may be defined for displaying information from a database regarding a customer order. The form might include a first field for showing a customer name and a second field, dependent upon the first field, for showing the street address of the customer selected in the first field.

When a user modifies the value shown by a form field, the user expects any other fields that are dependent upon the modified field to be updated to reflect the modified value. For instance, if a user modifies the customer shown in the first field in the example given above, the user will expect the second field to be updated to reflect the correct street address of the newly selected customer. If dependent fields are not updated in this manner, the user might be presented with stale information and may become confused.

Certain client-side database applications provide functionality for synchronizing form fields in the manner described above. However, in client-server environments, such as database applications implemented via the World Wide Web ("Web"), it can be very expensive in time and performance to synchronize dependent form fields in this way.

It is with respect to these and other considerations that the disclosure made herein is presented.

SUMMARY

Technologies are described herein for the synchronization of form fields in a client-server environment. Through an implementation of the concepts and technologies presented herein, database forms can be defined for use in a client-server environment that include one or more form fields that are dependent upon other form fields. Values shown by dependent form fields can be updated in an automated fashion in response to the modification of the fields upon which they depend. This can be accomplished utilizing the concepts and technologies presented herein in a client-server environment in a performant manner.

According to one aspect presented herein, functionality is disclosed for defining a database form usable in a client-server environment. Through the use of the design-time functionality disclosed herein, a form can be defined that includes a first user interface ("UI") control configured to display a first value from a database. The form can also be defined to include a second UI control configured to display a second value from the database, the second value being dependent upon the first value. When a client renders the form, a modification to the first value by way of the first UI control will cause the second UI control to display an updated second value. In this manner, a value displayed by the second UI control is "synchronized" to the value displayed by the first UI control. This can occur without modifying the contents of the database.

According to another aspect, one or more user interfaces may also be provided for specifying at design-time whether the updated second value should be generated at a client tier, such as a Web browser application program, or at a server computer. An application tier, a database tier, or a combined application/database tier executing at the server computer may be utilized to generate the updated second value. Based upon information provided at design-time, the updated second value will be generated at either the client tier or at the server computer.

According to another aspect, a system is provided for synchronizing database form fields in a client-server environment. In one embodiment, the system includes a database tier, an application tier, and a client tier. The database tier is configured to maintain and provide access to a database. The application tier is configured to receive and respond to requests for a form, the form including data defining a first UI control for displaying a first value from the database and a second UI control for displaying a second value from the database that is dependent upon the first value. The application and database tiers may be combined into a single application/database tier.

The client tier is configured to render the form to show the first value in the first UI control and to show the second value in the second UI control. The client tier is further configured to detect a modification to the first value and to cause an updated second value to be generated in response to detecting the modification to the first value. The updated second value is displayed by way of the second UI control. As discussed above, the updated second value may be generated at the client tier, at the application tier, at the database tier, or at a combined application/database tier. The updated second value may also be generated without modifying the contents of the database.

In one embodiment, the client tier is further configured to remove the display of the second value following receiving the modification to the first value and prior to displaying the updated second value. In this manner, a user is not presented with stale information while the updated second value is being generated.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5C are user interface diagrams showing the synchronization of several form fields in a client-server environment according to one embodiment disclosed herein.

DETAILED DESCRIPTION

Figure 1:
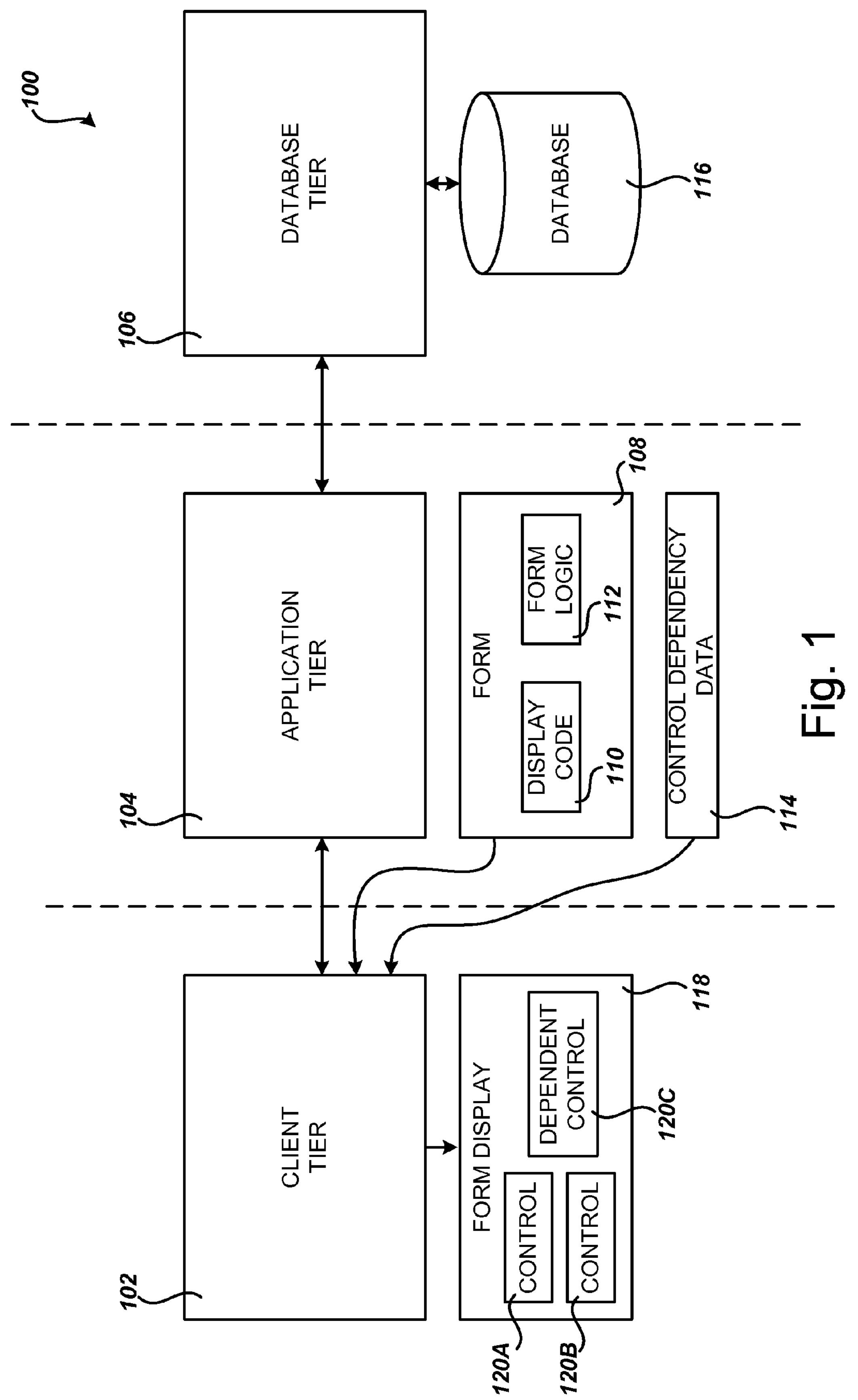
FIG. 1 is a software architecture diagram showing one illustrative architecture presented herein for synchronizing form fields in a client-server environment.

The following detailed description is directed to technologies for synchronization of form fields in a client-server environment. As discussed briefly above, a database tier is disclosed herein that maintains and provides access to a database. An application tier is also provided that receives and responds to requests for a form. The form includes data defining a first UI control for displaying a first value from the database and a second UI control for displaying a second value from the database that is dependent upon the first value. A client tier is also disclosed that renders the form to show the first value in the first UI control and to show the second value in the second UI control. The client tier also detects a modification to the first value and causes an updated second value to be generated in response to detecting the modification to the first value. The updated second value is displayed by way of the second UI control. The updated second value is generated at the client tier, the application tier, the database tier, or at a combined application/database tier While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for synchronizing form fields in a client-server environment will be described.

Turning now to FIG. 1, details will be provided regarding one embodiment presented herein for synchronization of form fields in a client-server environment. In particular, FIG. 1 is a software architecture diagram showing one illustrative architecture presented herein for synchronizing form fields in a client-server environment. As shown in FIG. 1, an illustrative architecture 100 for implementing the embodiments presented herein includes a client tier 102, an application tier 104, and a database tier 106. Each of these components will be described in detail below.

The database tier 106 illustrated in FIG. 1 represents one or more software components executing on a computer system that are configured to maintain and provide access to a database 116. In one implementation, the database 116 is a relational database. It should be appreciated, however, that other types of database technologies might be utilized.

The architecture 100 shown in FIG. 1 also includes an application tier 104. The application tier 104 is one or more software components executing on a computer system that are configured to receive and respond to requests for a form 108. For instance, as described in greater detail below, the application tier 104 might include a Web server component executing a Web application that is configured to provide forms, such as the form 108, in a client-server environment.

The form 108 is configured for use in a client-server environment and includes data defining a first UI control for displaying a first value from the database 116 and data defining a second UI control for displaying a second value from the database 116. The second value may be dependent upon the first value. The form 108 also includes display code 110 and form logic 112 in one embodiment.

The display code 110 is program code that may be rendered or executed on the client tier 102 and that is configured for receiving data values from the database 116 and displaying the data values. The form logic 112 is executable code configured to execute on the client tier 102 that manages interaction with the form 108 and that communicates with the application tier 104 and/or the database tier 106 to retrieve the values from the database 116 that are displayed by the form 108. Additional details regarding the functionality provided by the display code 110 and the form logic 112 will be provided below.

As also illustrated in FIG. 1, the architecture 100 includes a client tier 102 that is configured to render the form 108. In particular, a form display 118 is generated when the client tier 102 renders the form 108. For instance, the form display 118 may be displayed on a display screen connected to a computer executing a Web browser program capable of rendering the form 108. As described briefly above, the form 108 defines one or more UI controls 120A-120C (which may be referred to collectively as UI controls 120 or individually as UI control 120) that are displayed in the form display 118. As also discussed above, certain UI controls, such as the dependent UI control 120C, may be dependent upon values displayed by other UI controls. For instance, in the example shown in FIG. 1, the dependent control 120C may be configured to display a value from the database 116 that is dependent upon a value displayed by the UI controls 120A and/or 120B.

According to embodiments presented herein, the client tier 102 is further configured to detect a modification to a value generated by a UI control 120 and, in response to detecting such a modification, to cause an updated value to be displayed by any UI controls that are dependent upon the modified UI control. For instance, in the example shown in FIG. 1, if the dependent control 120C is dependent upon the UI control 120A, a modification to the value shown by the control 120A will cause an updated value to be generated and displayed by the dependent control 120C.

According to embodiments presented herein, the updated value displayed by the dependent control 120C may be generated at the client tier 102, the application tier 104, or the database tier 106. In another implementation, the application tier 104 and the database tier 106 are combined. In this embodiment, the updated value displayed by the dependent control 120C may be generated by the combined application/database tier. Additionally, as will be described in greater detail below, the updated value displayed by the dependent control 120C may be displayed by the client tier 102 without modifying the database 106.

As will also be described in greater detail below, a graphical user interface may be provided for use at the client tier 102 that allows a designer of the form 108 to specify whether updated values are generated at the client tier 102 or at a server computer, such as a server computer executing at the application tier 104, the database tier 106, or a combined application/database tier. This information is used at runtime (i.e. the time at which the form 108 is rendered by the client tier 102) to determine whether the updated value shown by a dependent UI control should be calculated at the client tier 102 or at a server computer executing the application tier 104 or the database tier 106. Additional details regarding one design time process for specifying the location at which updated values should be calculated will be provided below with respect to FIG. 3.

According to one implementation, the application tier 104 provides control dependency data 114 to the client tier 102. The control dependency data 114 is data that indicates when a UI control, such as the UI control 120C is dependent upon another UI control, such as UI controls 120A and/or 120B. As will be discussed in greater detail below, the client tier 102 utilizes the control dependency data 114 at the time a value displayed by a UI control 120 is modified to determine whether any other UI controls 120 depend upon the modified value. If, using the control dependency data 114, the client tier 102 determines that another UI control depends upon the modified value, the client tier 102 will cause an updated value to be generated for display by the dependent control. As discussed above, the updated value may be generated at the client tier 102, the application tier 104, the database tier 106, or a combined application/database tier. Additional details regarding this process will be provided below.

Figure 2:
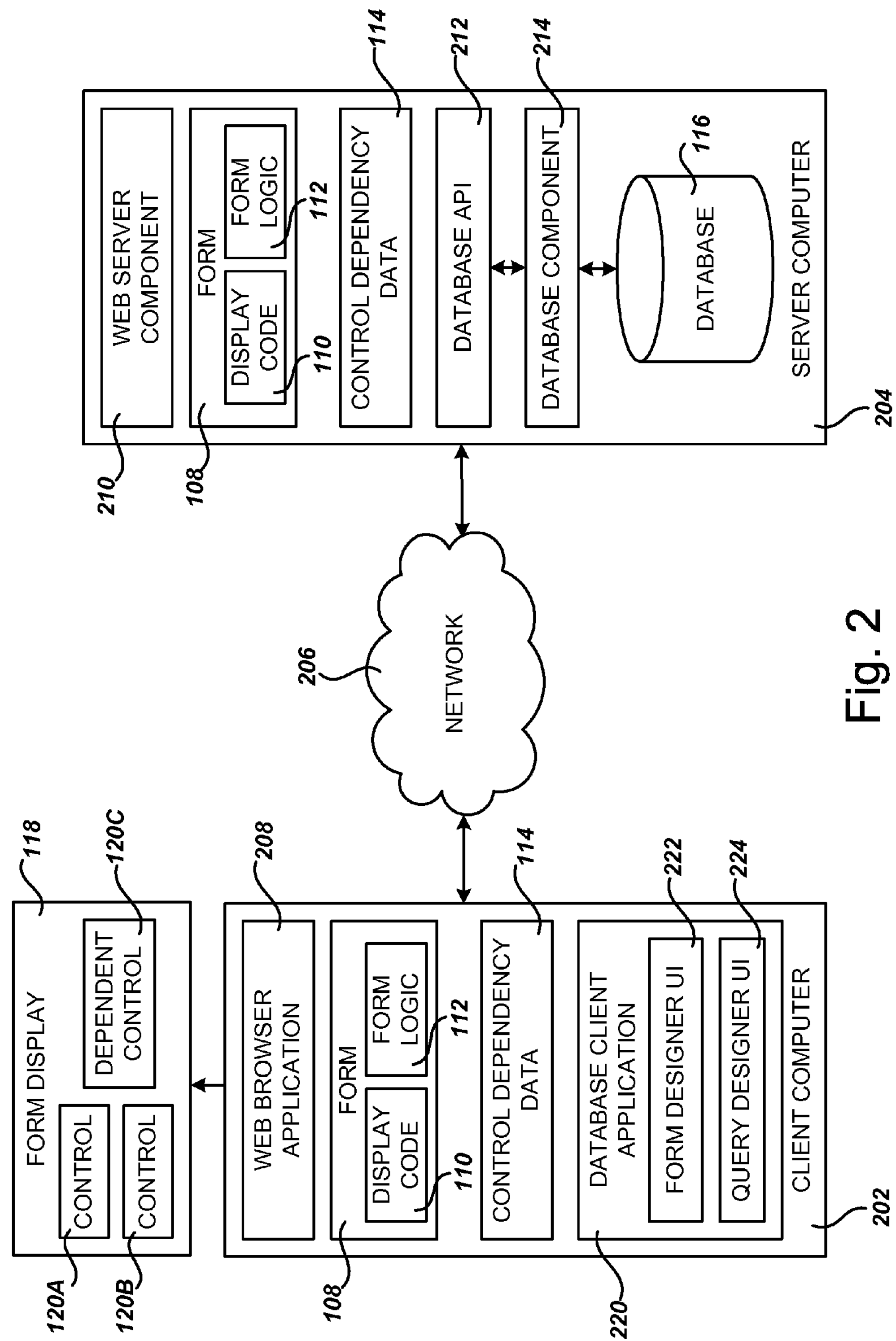
FIG. 2 is a network and computer system architecture diagram showing an architecture utilized in one embodiment disclosed herein for synchronizing form fields in a client-server environment.

Referring now to FIG. 2, a network and computer system architecture diagram will be described that shows an architecture utilized in one embodiment disclosed herein for synchronizing form fields in a client-server environment. In the embodiment shown in FIG. 2, the client tier 102 is implemented at a client computer 202. In this example, the application tier 104 and database tier 106 are implemented at a server computer 204. It should be appreciated that while a single client computer 202 and a single server computer 204 have been illustrated in FIG. 2, many such computing systems might be utilized in other embodiments. Additionally, it should be appreciated that although the application tier 104 and database tier 106 are illustrated in FIG. 2 as being implemented at a single server computer 204, these components may be executed at multiple or different server computers 204. For instance, a server farm utilizing many such server computers 204 might be utilized to implement the application tier 104 and the database tier 106 in other embodiments.

As also shown in FIG. 2, the client computer 202 and the server computer 204 are interconnected by way of a data communications network 206. According to one implementation, the network 206 is the Internet. It should be appreciated, however, that other types of networks might be utilized, including local area networks, wide area networks, wireless networks, and others.

In the example shown in FIG. 2, the application tier 104 is implemented by a Web server component 210. The Web server component 210 is an executable software component configured for execution on the server computer 204 that, among other things, is configured to receive and respond to requests from a Web browser application 208 for the form 108. The Web server component 210 might also provide other functionality. For instance, the Web server component 210 may be implemented as Web application for providing for particular functionality. For instance, a Web application may be created for customer relationship management, performing accounting functions, and providing other types of functionality.

The Web server component 210 may utilize a database tier 106 that is implemented by a database component 214 in the example shown in FIG. 2. The database component 214 provides functionality for maintaining and providing access to the database 116. As discussed above, the database component 214 may be a software component configured to provide relational database services or another type of database component configured to provide access to another type of database. In one implementation, the database component 214 is configured to expose a database application programming interface (API) 212 for providing access to services provided by the database component 214. Details regarding the functionality provided by the database API 212 will be provided below.

In the example shown in FIG. 2, the client tier 102 is implemented by Web browser application 208. As known to those skilled in the art, a Web browser application 208 is an application configured to receive and render Web pages. In the example presented herein, the Web browser application 208 is also configured to request the form 108 from the Web server component 210, to receive the form 108, and to render the form to generate a form display 118. As discussed above, the form display 118 may be displayed on a display device connected to the client computer 202. In the example shown in FIG. 2, the form display 118 includes three UI controls 120A-120C. The UI control 120C is dependent upon one or more of the UI controls 120A-120B.

As also described briefly above, in order to render the form 108, the display code 110 is rendered and/or executed by the Web browser application 208. The display code 110 communicates with the server computer 204 to retrieve values from the database 116 that are displayed by the UI controls 120A-120C. The Web browser application 208 is also configured to execute the form logic 112. As discussed above, the form logic manages client-side interaction and communicates with the database API 212 to retrieve data from the database 116. Additional details regarding the operation of the display code 110 and the form logic 112 will be provided below.

As also described briefly above, the Web server component 210 is configured in one implementation to generate control dependency data 114 at the time the form 108 is provided to the Web browser application 208. The form logic 112 executing in the Web browser application 208 is configured to utilize the control dependency data 114 to determine whether an updated value for a dependent control 120C should be generated at the client computer 202 or at the server computer 204. Additional details regarding the process will be provided below.

As also discussed briefly above with respect to FIG. 1, the client computer 202 also provides functionality for allowing a designer of the form 108 to specify whether updated values for dependent UI controls 120C should be generated at the client computer 202 or at the server computer 204. In particular, according to one implementation, the client computer 202 is configured to execute a database client application 220.

In one embodiment, the database client application 220 is configured to provide a graphical user interface for defining the form 108. As part of the functionality provided by the graphical user interface, a user may be able to specify that an updated value for a dependent UI control 120C should be generated at the client computer 202 or at the server computer 204. In one embodiment, if the user specifies that an updated value for a dependent UI control 120C should be generated at the client computer 202, then a form designer user interface 222 is provided for allowing the user to specify the manner in which the updated value should be generated at the client computer 202. If the user specifies that an updated value for a dependent UI control 120C should be generated at the server computer 204, a query designer user interface 224 may be provided for allowing the user to specify the manner in which the updated value for the dependent UI control 120C should be generated at the server computer 204.

As discussed briefly above, when the Web browser application 202 detects a modification to one of the UI controls 120A-120C, the Web browser application 208 is configured to determine whether an updated value for dependent controls should be generated at the client computer 202 or the server computer 204. The Web browser application 208 is then configured to cause the updated value for the dependent control 120C to be generated in the appropriate location and to display the updated value in the dependent UI control 120C. Additional details regarding this process will be provided below.

According to one implementation, the form designer UI 222 may allow a user of the client computer 202 to specify a form expression to be utilized for computing the value displayed by a dependent UI control 120C at the Web browser application 208. The form expression may specify one or more operations to be performed on values retrieved from the database 116. The operations are executed at the Web browser application 208. For instance, a form expression may specify that two or more values retrieved from the database 116 should be concatenated and displayed in a dependent UI control 120C. Other types of operations may be defined in a similar manner. By specifying a form expression, a designer of the form 108 makes an implicit request that the value for a dependent UI control 120C utilizing the form expression be generated at the client computer 202.

According to implementations, a user of the client computer 202 may utilize the query designer UI 224 to specify that a value to be generated by dependent control 120C be generated at the server computer 204 in a number of different ways. For instance, a user of the query designer UI may define a calculated field for display by the dependent control 120C that is generated by an underlying query. For example, a query may be defined that is performed by the database component 214 that performs a concatenation operation on two or more values from the database 116. Another way in which a user of the query designer UI 224 may specify that the server computer 204 generate a value for dependent control 120C is through the use of calculated columns and base tables maintained by the database component 214. In this example, calculated columns containing values displayed by dependent control 120C are stored as part of a base table maintained by the database component 214.

Another mechanism that a user of the query designer UI 224 may utilize to specify that values displayed by dependent controls 120C are to be generated at the server computer 204 are join dependencies. As known to those skilled in the art, a join dependency exists in a query that joins two or more tables in a database 116. A user may also specify UI controls 120A-120C that display values from duplicate fields. For instance, a form 108 may be defined that has two fields on the form that utilize the same value from the database 116. If a user of the form 108 changes one of the values, then the other value should also change. By specifying duplicate fields in this manner, a user of the client computer 202 may implicitly request that the server computer 204 generate an updated value for the duplicate controls.

According to one implementation, the query designer UI 224 may also be utilized to specify UI controls 120A-120C on a form that include default values. For instance, a form 108 may be defined such that when a new row is created, default values are displayed in the UI controls 120A-120C. As an example, a form 108 may be defined for creating an order. When a user of the form 108 clicks a button for creating a new order, the form 108 is configured to show default values, such as a customer name, address, and other details, for the new order. In this example, the values for the controls 120C showing the default values are also generated at the server computer 204. It should be appreciated, therefore, that by specifying default values at design time a user of the client computer 202 may implicitly request that the default values be computed at the server computer 204. Additional details regarding the design time process for creating the form 108 will be provided below with respect to FIG. 3.

Figure 3:
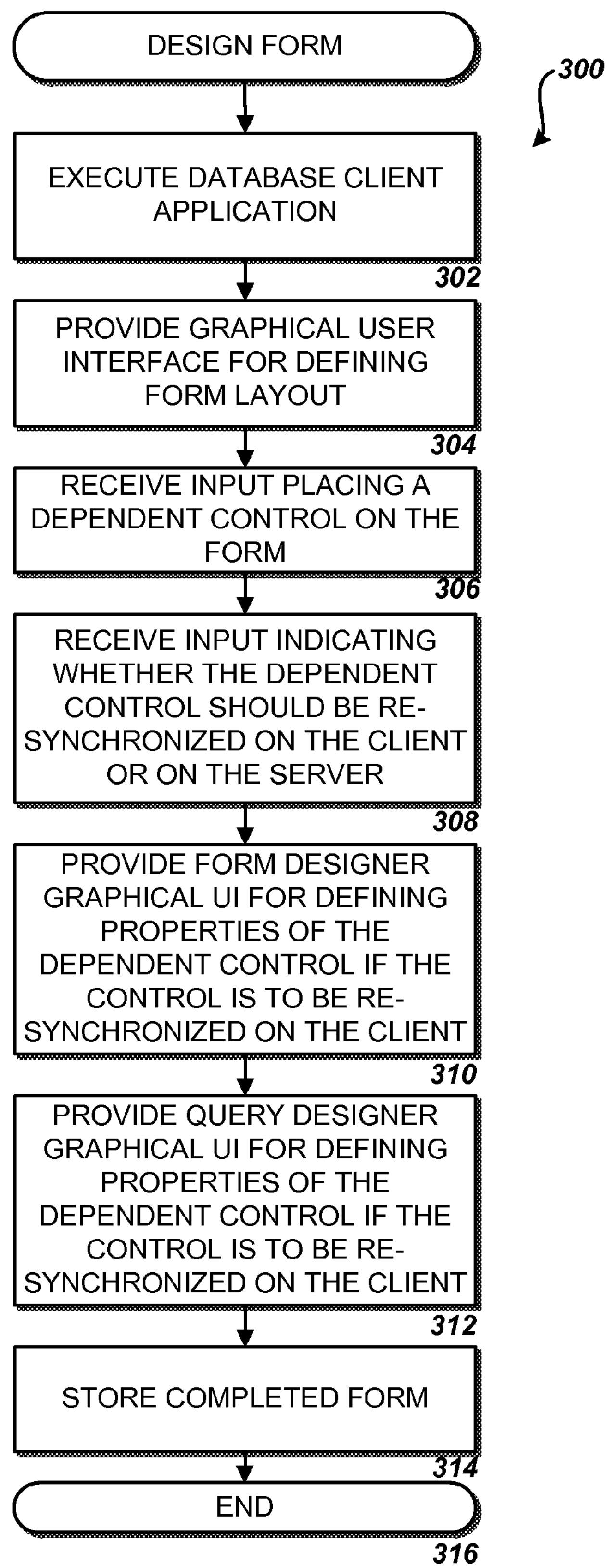
FIG. 3 is a flow diagram showing aspects of a method provided in one embodiment disclosed herein for creating a form having fields that can be synchronized in a client-server environment.

Turning now to FIG. 3, additional details will be provided regarding the embodiments presented herein for synchronizing form fields in a client-server environment. In particular, FIG. 3 shows a routine 300 that illustrates aspects of a method provided in one embodiment disclosed herein for creating a form 108 having fields that can be synchronized in a client-server environment.

It should be appreciated that the logical operations described herein with respect to FIG. 3 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the client computer 202 executes the database client application 220. As discussed above, the database client application 220 is configured to provide a graphical user interface ("GUI") for defining the form 108. It should be appreciated that other types of applications might also provide functionality for designing the form 108, including applications executing on the server computer 204. From operation 302, the routine 300 proceeds to operation 304.

At operation 304, the database client application 220 provides a GUI for defining the layout of the form 108. For instance, the databases client application 220 might provide a GUI for specifying the location of the UI controls 120A-120C and other elements to be displayed on the form 108. From operation 304, the routine 300 proceeds to operation 306.

At operation 306, the database client application 220 receives input placing a dependent UI control 120C on the form 108. As described above, a dependent UI control 120C is a user interface control that displays a value that is dependent upon a value displayed by another UI control, such as the UI controls 120A-120B. In response to receiving input placing a dependent UI control 120C on the form 108, the routine 300 proceeds to operation 308.

At operation 308, the database client application 220 receives input indicating whether the dependent control 120C should be resynchronized on the client computer 202 or on the server computer 204. The term "resynchronization", as utilized herein, refers to the process of generating an updated value for the dependent control 120C in response to detecting a modification to a value displayed by a UI control 120 upon which the dependent control 120C depends.

As also described above, the input indicating whether the dependent control should be resynchronized on the client computer 202 or the on the server computer 204 may be made implicitly. For instance, if a user specifies that a form expression should be utilized to calculate the updated value for the dependent control 120C, the user is implicitly requesting that the updated value be computed at the client computer 202. If, on the other hand, the user specifies a calculated field in an underlying query, a calculated column in a base table, a join dependency, duplicate fields, or default values, the user is implicitly requesting that the updated value for the dependent UI control 120C be calculated at the server computer 204. The request to resynchronize a control at the client computer 202 or at the server computer 204 might also be made explicitly.

From operation 308, the routine 300 proceeds to operation 310 where the database client application 220 provides the form designer UI 222 for defining the properties of the dependent control 120C if the user requests that the dependent control 120 be resynchronized at the client computer 202. The form designer UI 222 may include particular UI components for specifying the manner in which the dependent control 120C is updated at the client computer 202. For instance, the form designer UI 222 may provide functionality for defining properties of a form expression.

From operation 310, the routine 300 proceeds to operation 312 where the database client application 220 provides the query designer UI 224 if the user specifies that the value for the dependent control 120C is to be updated at the server computer 204. The query designer UI 224 provides UI elements for allowing a user to specify the manner in which a dependent control 120C is updated at the server computer 204. For instance, the query designer UI 224 might provide a graphical user interface for specifying a database query. Once the user has completed defining the layout and other aspects of the form 108, the routine 300 proceeds to operation 314 where the completed form 108 is stored at the server computer 204. The routine 300 then proceeds from operation 314 to operation 316, where it ends.

Figure 4A:
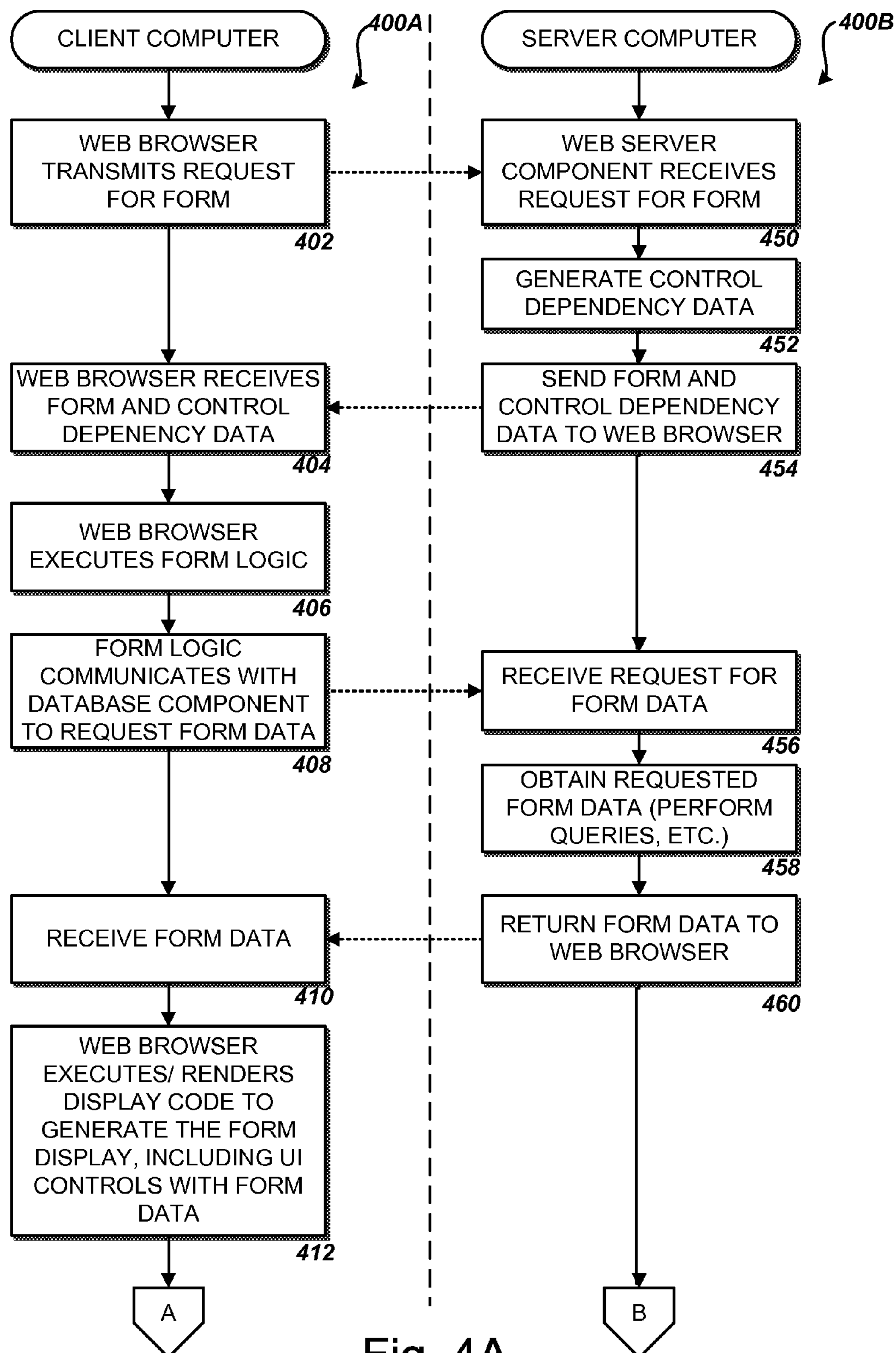
FIGS. 4A-4C are flow diagrams showing aspects of a method provided in one embodiment disclosed herein for run-time processing for providing synchronization of form fields in a client-server environment.
Figure 4B:
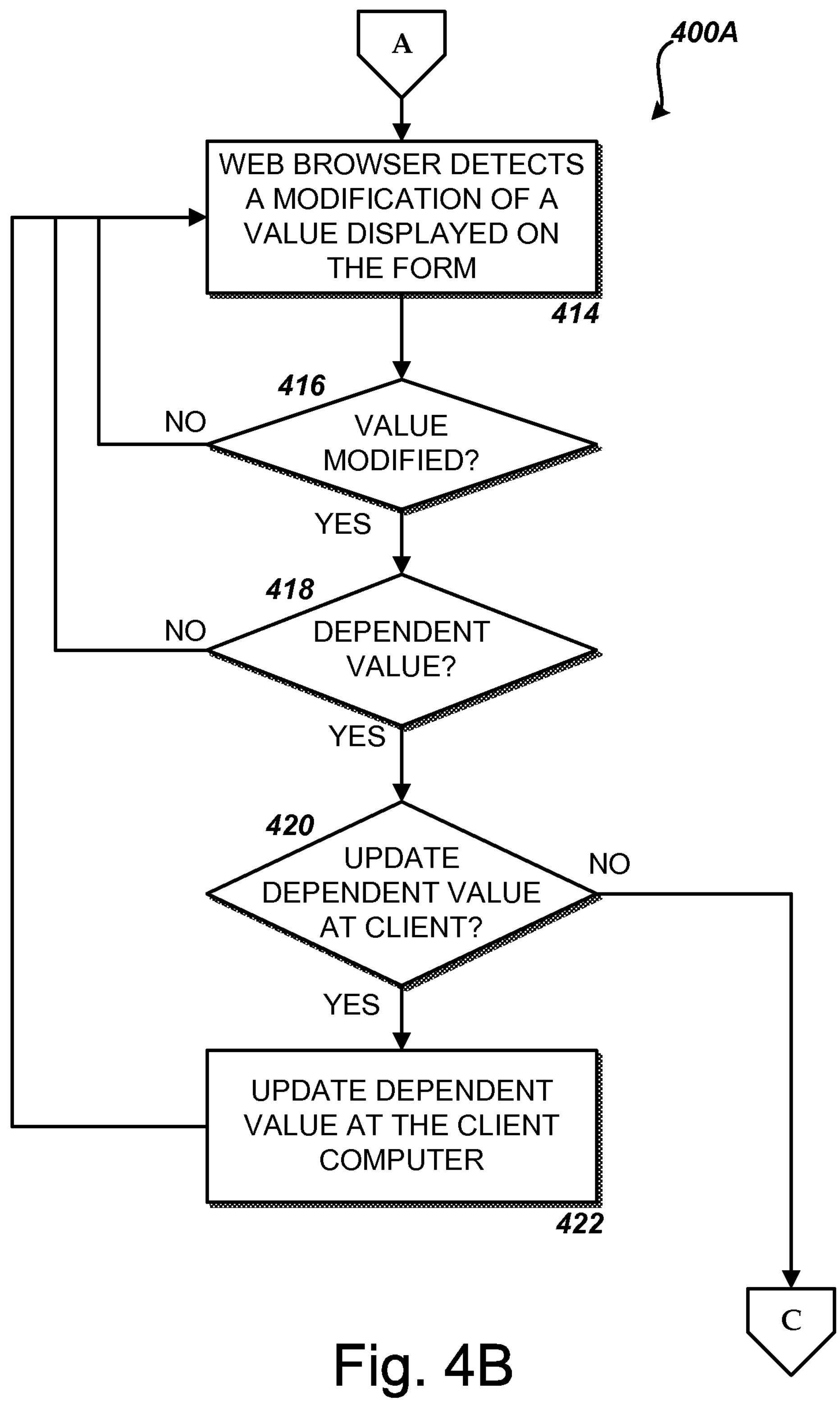
Figure 4C:
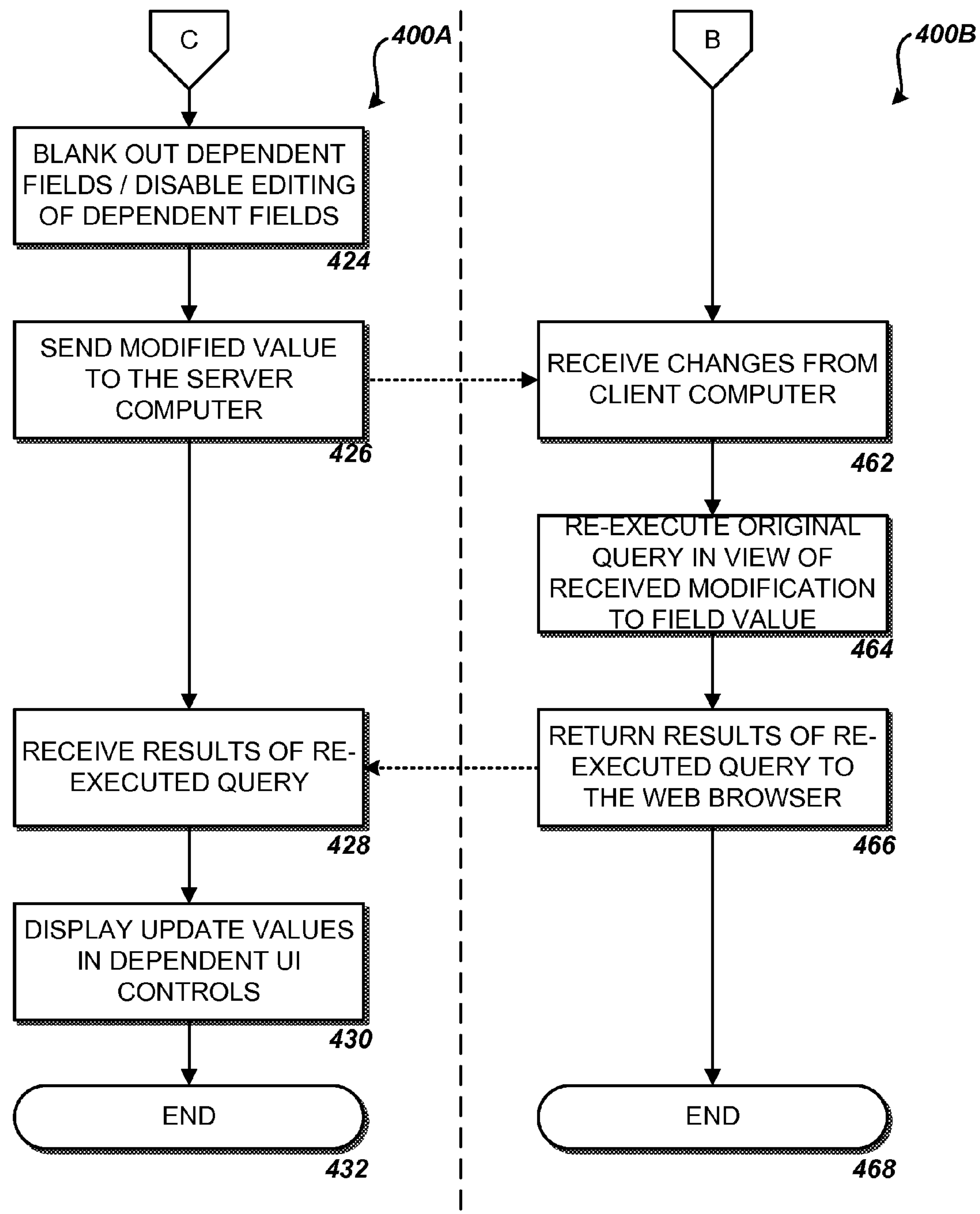

Turning now to FIGS. 4A-4C, several routines 400A-440B will be described illustrating aspects of the operation of the client computer 202 and the server computer 204, respectively, for synchronizing form fields in a client-server environment. The routine 400A begins at operation 402 where the Web browser application 208 transmits a request to the Web server component 210 for the form 108. The Web server component 210 receives the request at operation 450 of the routine 400B. In response to receiving a request, the Web server component 210 generates the control dependency data 114 for the form 108. As discussed above, the control dependency data 114 identifies dependent UI controls 120C for which updated values may need to be computed at the server computer 204. Once the control dependency data 114 has been generated, the routine 400B proceeds to operation 454 where the Web server component 210 transmits the form 108 and the control dependency data 114 to the Web browser application 208 in response to the original request.

At operation 404 of the routine 400A, the Web browser application 208 receives the form 108 and the control dependency data 114 from the Web server component 210. The routine 400A then proceeds to operation 406 where the Web browser application 208 executes the form logic 112. At operation 408 of the routine 400A the form logic 112 communicates with the database component 214 to request values for use in populating the controls 120A-120C.

At operation 456 of the routine 400B, the database component 214 receives the request for the form data. In response to receiving the request, the routine 400B proceeds to operation 458 where the database component 214 retrieves the requested form data. For instance, the database component 214 may execute queries against the database 116, read from base tables in the database 116, and/or perform other processing. Once the database component 214 has retrieved the requested values, these values are returned to the form logic 112 at operation 460 of the routine 400B.

At operation 410 of the routine 400A, the form logic 112 receives the requested values from the database component 214. The display code 110 is then executed in order to generate the form display 118 including the UI controls 120A-120C and any values that are to be displayed by the UI controls 120A-120C. From operation 412, the routine 400A then proceeds to operation 414 where the Web browser application 208 detects a modification of a value displayed by one of the UI controls 120A-120C on the form 108. If no values have been modified, the routine 400A proceeds from operation 416 to operation 414 where another such determination is made. If a value has been modified, however, the routine 400A proceeds from operation 416 to operation 418. At operation 418, the Web browser application 208 determines whether the modified value is associated with a dependent UI control 120C. If not, the routine 400A returns to operation 414, described above. If the modified value is dependent upon another UI control, the routine 400A proceeds from operation 418 to operation 420.

At operation 420, the Web browser application 208 determines whether the value to be displayed by the dependent control 120C can be updated at the client computer 202. For instance, according to one implementation, the control dependency data 114 may be consulted to make this determination. Other data contained within the form 108 might be consulted as well. For instance, data indicating that a form expression should be utilized to generate the updated value may indicate to the Web browser application 208 that the updated value can be generated at the client computer 202.

If the value to be displayed by the dependent UI control 120C can be generated at the client computer 202, the routine 400A proceeds to operation 422. At operation 422, the updated value for the dependent UI control 120C is generated at the client computer 202. For instance, the value of a form expression may be computed by the form logic 112 in one implementation. The routine 400A then proceeds from operation 422 to operation 414 where additional modifications to values displayed by UI controls 120A-120C on the form 108 may be processed.

If, at operation 420, the Web browser application 208 determines that an updated value for the dependent UI control 120C cannot be generated at the client computer 202, the routine 400A proceeds to operation 424. At operation 424, the Web browser application 208 removes the display of any dependent UI controls on the form 108. The Web browser application 208 might also disable editing of the values shown by dependent UI controls on the form 108. By removing the display of the value shown by a dependent UI control 120C following the detection of a modification to another UI control 120, and prior to displaying the updated value in the dependent control 120C, the Web browser application 208 ensures that a user will not be presented with stale information or permitted to edit stale information.

From operation 424, the routine 400A proceeds to operation 426 where the Web browser application 208 transmits the value that was modified by way of the form display 118 to the Web server component 210 executing on the server computer 204. The Web server component 210 receives the changes to the form values from the client computer 202 at operation 462 of the routine 400B. The routine 400B then continues to operation 464 where the query utilized to generate the form values originally utilized to populate the form display 118 is re-executed in view of the modified value identified by the Web browser application 208.

According to one implementation, the Web server component 210 utilizes the detected modifications to values shown in the form display 118 and inserts the modifications between a base table maintained by the database component 214 and the original query. The Web server component 210 then causes the original query to be executed in view of the modified value or values. In this manner, a query is performed that is essentially a simulation of the contents of the database 116 that includes the modification made by way of the form display 118. In this way, a new value for the dependent control 120C can be generated in view of the modifications made to the form without modifying the contents of the database 116. Once the results of the re-executed query have been generated, these results are returned to the Web browser application 208 at operation 466 of the routine 400B. The routine 400B then proceeds from operation 466 to operation 468, where it ends.

At operation 428 of the routine 400A, the form logic 112 executing within the Web browser 208 receives the results of the re-executed query from the Web server component 210. The form logic 112 then causes the updated value to be displayed by the dependent control 120C at operation 430 of the routine 400A. In the example shown in FIG. 2 and described above, only a single dependent UI control 120C has been illustrated. It should be appreciated, however, that many such dependent UI controls 120C may be present on a form display 118 and updated in a manner similar to that described above. Once each dependent control 120C has been updated appropriately, the routine 400A proceeds from operation 430 to operation 432, where it ends.

It should be appreciated that, according to embodiments, the database API 212 mentioned briefly above with respect to FIG. 2 may be utilized by the Web server component 210 for obtaining an updated value for a dependent control 120C. In particular, the database API 212 may expose a mechanism by which the Web server component 210 can request the re-execution of an original query in view of one or more modified values. In response to such a request, the database API 212 causes the database component 214 to generate the simulated query described above and returns results of the query to the Web server component 210. It should be appreciated that other mechanisms for re-executing a query in view of changes made to a form 108 might also be utilized.

Figure 5B:
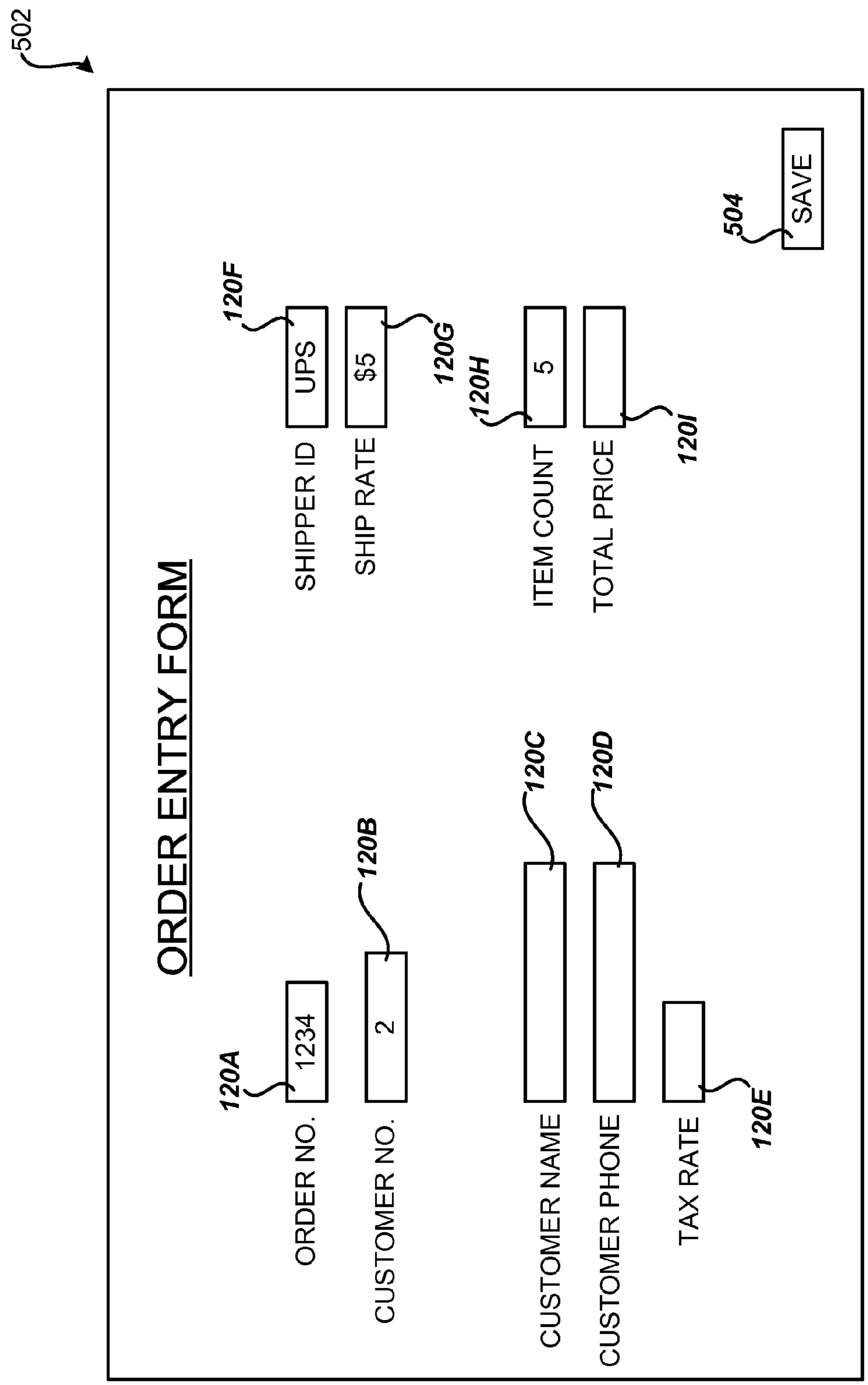

Referring now to FIGS. 5A-5C, an illustrative user interface 502 showing the synchronization of several form fields in a client-server environment according to one embodiment disclosed herein will be described. In particular, FIG. 5A shows a user interface 502 generated by the Web browser application 208 in the manner described above. The UI 502 is a form display 118 that includes a number of UI controls 120A-120I for displaying values relating to a customer order. In particular, the UI control 120A displays a value representing a order number, the UI control 120B displays a value representing a customer number, the UI control 120C displays a value representing a customer name, the UI control 120D displays a value representing a customer phone number, and the UI control 120E displays a value representing a tax rate for the customer selected utilizing the UI control 120B. Other UI controls 120E-120I show values for a shipper, a ship rate, an order item count, and a total order price, respectively.

As shown in FIG. 5A, an appropriate user input device, such as a mouse, may be utilized to select a customer utilizing the UI control 120B. In this example, the customer name displayed by the UI control 120C, the customer phone number displayed by the UI control 120D, and the tax rate displayed by the UI control 120E are to be updated in response to the modification of the value displayed by the UI control 120B. Additionally, the total price for an order shown by the UI control 120I is also to be updated if the tax rate for the selected customer changes.

In the example shown in FIG. 5A, a mouse cursor is utilized to select a new customer number. In response thereto, the values displayed by the UI controls 120C, 120D, 120E and 120I are removed while updated values are being generated either at the client computer 202 or at the server computer 204. This is illustrated in FIG. 5B.

As described above, in order to generate updated values to be displayed by the UI controls 120C, 120D, 120E, and 120I, the Web browser application 208 may transmit the modified value to the Web sever component 210. For instance, in this example, the Web browser application 208 may indicate to the Web server component 210 that the customer number in the example shown in FIG. 5A-5C has been changed from one to two. As also described above, in response thereto, the Web server component 210 causes a new query to be generated over the database 116 in view of the updated customer number. In response thereto, the customer name, customer phone number, tax rate and total price values may be generated and returned to the Web browser application 208.

In response to receiving the values, the web browser application 208 updates the values for the UI controls 120C, 120D, 120E, and 120I and causes the updated values to be displayed as shown in FIG. 5C. It should be appreciated that these updated values can be generated and displayed without a user committing a change to the database 116, such as by selecting the save button 504. A user may select the save button 504 in order to commit the modifications to the order to the database 116.

It should be appreciated that the user interfaces shown in FIGS. 5A-5C are merely illustrative and many other types of form layouts may be generated and utilized. It should also be appreciated that other types of dependencies may be created between form fields as known to those skilled in the art. It should also be appreciated that the database client application 220, including the form designer UI 222 and the query designer UI 224, may be utilized to design the UI 502 illustrated in FIGS. 5A-5C and to save data defining such a UI 502 in the form 108.

Figure 6:
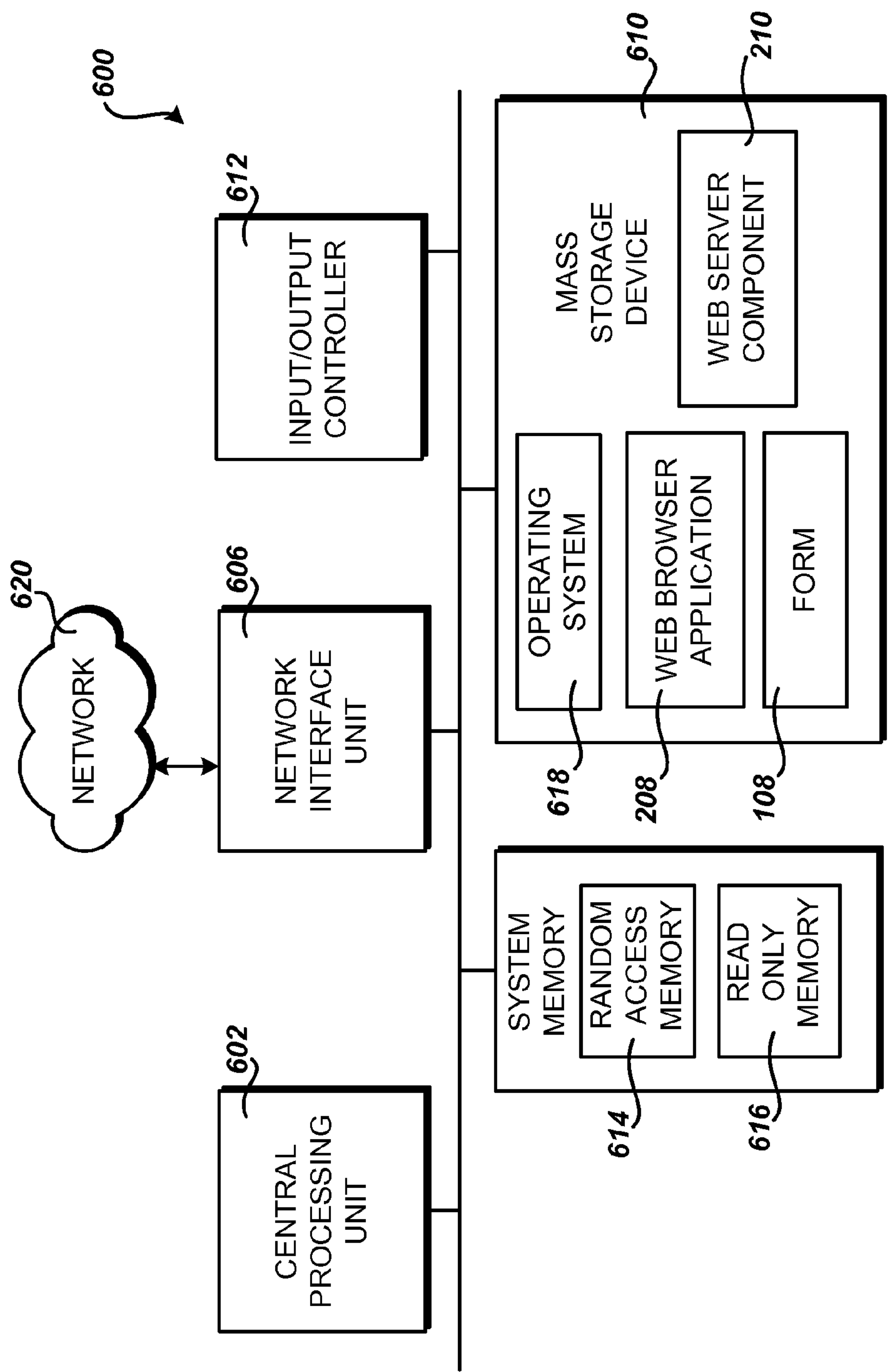
FIG. 6 is a computer architecture diagram showing an illustrative computer hardware and software architecture for a computing system capable of implementing the various embodiments presented herein.

FIG. 6 shows an illustrative computer architecture for a computer 600 capable of executing the software components described herein for synchronizing form fields in a client-server environment. The computer architecture shown in FIG. 6 illustrates a conventional desktop, laptop computer, or server computer and may be utilized to execute the various software components described herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system ("BIOS") containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable storage media can be any available computer storage media that can be accessed by the computer 600.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the Web browser application 208, the Web server component 210, and the other software components described above. The mass storage device 610 and RAM 614 may also store other program modules and data, such as the form 108.

In general, software applications or modules may, when loaded into the CPU 602 and executed, transform the CPU 602 and the overall computer 600 from a general-purpose computing system into a special-purpose computing system customized to perform the functionality presented herein. The CPU 602 may be constructed from any number of transistors or other discrete circuit elements, which may individually or collectively assume any number of states. More specifically, the CPU 602 may operate as one or more finite-state machines, in response to executable instructions contained within the software or modules. These computer-executable instructions may transform the CPU 602 by specifying how the CPU 602 transitions between states, thereby physically transforming the transistors or other discrete hardware elements constituting the CPU 602.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for synchronizing form fields in a client-server environment have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising performing computer-implemented operations for:

providing a graphical user interface for defining a form, the form comprising a first user interface control configured to display a first value from a database and a second user interface control configured to display a second value from the database, the second value dependent upon the first value;

providing a graphical user interface for specifying that an updated second value should be generated from the second value at a client tier in response to detecting a modification to the first value;

providing a graphical user interface for specifying that the updated second value should be generated at a server computer in response to detecting the modification to the first value; and providing a graphical user interface for specifying that the display of the second value is removed upon detecting the modification to the first value.

2. The computer-implemented method of claim 1, wherein the client tier comprises a web browser application.

3. The computer-implemented method of claim 2, wherein specifying that the updated second value should be generated at a server computer comprises specifying that the updated second value should be generated by an application tier executing on the server computer.

4. The computer-implemented method of claim 2, wherein specifying that the updated second value should be generated at a server computer comprises specifying that the updated second value should be generated by a database tier executing on the server computer.

5. The computer-implemented method of claim 2, further comprising:

displaying the form by way of the web browser application;

detecting the modification to the first value by way of the first user interface control;

causing the updated second value to be generated by way of the client tier or the server computer; and displaying the updated second value by way of the second user interface control.

6. The computer-implemented method of claim 1, wherein the updated second value is generated without modifying the database.

7. The computer-implemented method of claim 1, wherein causing the updated second value to be generated comprises:

determining whether the updated second value is to be generated by a web browser application or by the server computer; and generating the updated second value at the web browser application in response to determining that the updated second value is to be generated by the web browser application.

8. The computer-implemented method of claim 7, wherein the request is transmitted to a database application programming interface (API) exposed by the server computer.

9. The computer-implemented method of claim 1, wherein causing the updated second value to be generated further comprises requesting the updated second value from the server computer in response to determining that the updated second value is to be generated by the server computer.

10. The computer-implemented method of claim 9, wherein requesting the updated second value from the server computer comprises transmitting a request for an updated second value to the server computer, the request comprising the modification to the first value.

11. One of an optical disc, a magnetic storage device, or a solid state storage device having computer-executable instructions stored thereupon which, when executed by a computer, cause the computer to:

provide a graphical user interface for defining a form, the form comprising a first user interface control configured to display a first value from a database and a second user interface control configured to display a second value from the database, the second value dependent upon the first value;

provide a graphical user interface for specifying that an updated second value should be generated from the second value at a web browser application in response to detecting a modification to the first value;

provide a graphical user interface for specifying that the updated second value should be generated at a server computer in response to detecting the modification to the first value; and to provide a graphical user interface for specifying that the display of the second value is removed upon detecting the modification to the first value and prior to displaying the updated second value.

12. The one of the optical disc, the magnetic storage device, or the solid state storage device of claim 11, wherein specifying that the updated second value should be generated at a server computer comprises specifying that the updated second value should be generated by an application tier executing on the server computer.

13. The one of the optical disc, the magnetic storage device, or the solid state storage device of claim 11, wherein specifying that the updated second value should be generated at a server computer comprises specifying that the updated second value should be generated by a database tier executing on the server computer.

14. The one of the optical disc, the magnetic storage device, or the solid state storage device of claim 11, having further computer-executable instructions stored thereupon which, when executed by the computer, cause the computer to:

display the form by way of the web browser application;

detect a modification to the first value by way of the first user interface control;

cause an updated second value to be generated by way of the client tier or the server computer in response to detecting the modification to the first value; and to display the updated second value by way of the second user interface control.

15. The one of the optical disc, the magnetic storage device, or the solid state storage device of claim 11, wherein the updated second value is generated without modifying the database.

16. The one of the optical disc, the magnetic storage device, or the solid state storage device of claim 15, wherein cause an updated second value to be generated comprises:

determining whether the updated second value is to be generated by the web browser application or by the server computer; and generating the updated second value at the web browser application in response to determining that the updated second value is to be generated by the web browser application.

17. The one of the optical disc, the magnetic storage device, or the solid state storage device of claim 15, wherein cause an updated second value to be generated further comprises requesting the updated second value from the server computer in response to determining that the updated second value is to be generated by the server computer.

18. A computer-implemented method comprising performing computer-implemented operations for:

providing a first graphical user interface for defining a form, the form comprising a first user interface control configured to display a first value from a database and a second user interface control configured to display a second value from the database, the second value dependent upon the first value;

providing a second graphical user interface for specifying that an updated second value should be generated from the second value at a web browser application in response to detecting a modification to the first value;

providing a third graphical user interface for specifying that the updated second value should be generated at an application tier or a database tier executing on a server computer in response to detecting the modification to the first value;

displaying the form in the web browser application;

detecting a modification to the first value by way of the first user interface control;

in response to detecting the modification to the first value, removing the display of the second value and determining based upon input received via the second graphical user interface or the third graphical user interface whether an updated second value is to be generated by the web browser application or by the server computer;

causing the updated second value to be generated by the web browser application in response to determining that the updated second value is to be generated by the web browser application;

causing the updated second value to be generated by the server computer in response to determining that the updated second value is to be generated by the server computer; and displaying the updated second value by way of the second user interface control.

* * * * *